Patented Nov. 26, 1935

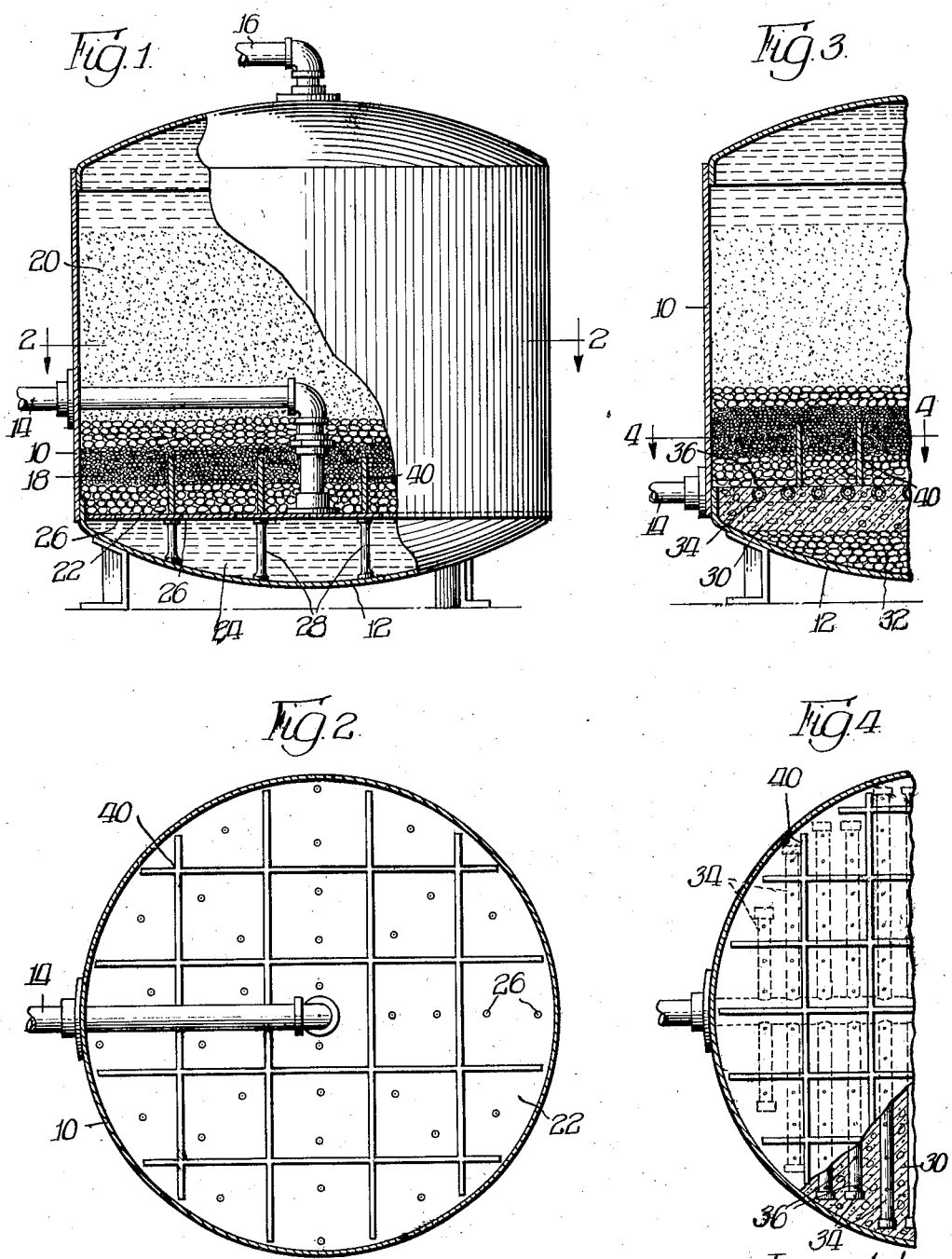

2,021,919

UNITED STATES PATENT OFFICE 2,021,919

WATER TREATING APPARATUS

John A. Montgomery, Denver, Colo., and Robert O. Friend, Chicago, Ill.

Application December 12, 1932, Serial No. 646,938

3 Claims. (Cl. 210—24)

This invention relates to water-treating apparatus such as water softeners of the zeolite type, filters, and the like. It has been illustrated as embodied in up-flow zeolite water softeners and would be likewise useful in any apparatus in which water is caused to flow upwardly over a wide area through fine, loose material such as might be unduly distributed or carried upwardly by the water if it flows too fast.

One of the great problems in all up-flow apparatus, whether the water flows upwardly constantly or only during certain steps, is to prevent channeling of the treating material and to prevent blow-outs of the graduated gravel bed commonly used for supporting such treating materials. The ideal condition would be a bed through which the water would invariably flow uniformly at all points, for it is the nature of the water-treating materials that if the water flows uniformly to such materials there will seldom, if ever, be any channeling within the materials. On the other hand it has been found in the past that if water is permitted to circulate freely in transverse directions, the flow will often be concentrated through one portion of the gravel with the result that channeling will take place in the treating material and often the bed will be blown. By a blown bed is meant a bed in which the finer gravel has been carried upwardly by an excessively rapid flow of water at a given point. The usual result is, first, that the water continues to flow excessively through that point causing channeling thereabove, and second, that when the zeolite or other water treating material settles the fine gravel is no longer in a position to retain it and it may be washed out through the dispersion plates or such other distribution system as may be used. Sometimes also the zeolites are carried so swiftly by the water flow through such a blown out bed that they may be carried out through the usual soft water or waste outlet at the top of the tank. Even when the bed is not blown a decided unevenness in the flow of the water necessarily reduces the efficiency of the water treating apparatus. It is evident that the utmost efficiency can only be attained when all parts of the treating material are used at maximum rate, or, if capacity use is not desired, then when all parts of the treating material are used up substantially simultaneously.

In a co-pending application, Serial No. 547,270, which issued December 13, 1932 as Patent No. 1,891,061, is disclosed an invention for overcoming these difficulties and for substantially attaining the ideal of uniform flow throughout the cross-section of the tank. The present application is a continuation of said application and claims the combination of features which accomplish this result. One of the principal features is the distributing of the orifices of the distribution system uniformly across the bottom of the tank and restricting these orifices so that their total area is of such size with relation to the size of the tank and the size of the supply pipes that water cannot flow through any of said orifices too fast under such pressures as the system will normally be subjected to. To a large extent this feature will be satisfactory alone, but not always, since in some instances cross currents will set up in the lower coarser bed of gravel which will result in the concentration of flow at particular points and the attendant disastrous effects of channeling or blowing the bed. To prevent this, the second feature is needed which comprises the use of a grid comprising intersecting partition members which form cells open at their top but otherwise substantially non-communicating with one another. These cells divide up the cross-section of the tank sufficiently to prevent such cross-current in the lower bed and thereby to prevent this cause of trouble. This feature, however, introduces a third difficulty, which is the concentration of flow along such vertical partitions. This difficulty may be overcome by extending the fine gravel bed over the vertical partitions.

In the drawing—

Figure 1 is a side elevation partly in section, of a typical softening tank of the zeolite type provided with a perforated bottom;

Figure 2 is a horizontal section therethrough taken on the line 2—2, Figure 1, with the mineral and gravel bed removed;

Figure 3 is a fragmentary vertical section through a softener of the type having a pipe distribution system in place of a perforated plate; and Figure 4 is a fragmentary horizontal section taken on the line 4—4, Figure 3.

Although this invention may take many forms, and although it may be used in other connections than in water softeners, it has been illustrated as embodied in a single type of water softener, but in the drawings illustrating such water softeners, two slightly different types of distribution systems have been shown. The structure of Figures 1 and 2, which uses a dispersion plate, and the structure of Figures 3 and 4, which uses a dispersion pipe system, are otherwise substantially the same. Thus, in each form there is a tank 10, having a bottom 12, a hard water feed pipe 14, a soft water outlet pipe 16, a graduated gravel bed 18, and a zeolite bed 20. The gravel bed preferably comprises a layer of coarse gravel at the bottom, with successive layers of successively finer gravel thereabove. There may also be upper coarser layers to help hold the finer gravel of the middle layers in place. This arrangement of the gravel is covered in prior Patent Number 1,787,698, issued upon the application of John A. Montgomery, one of the present applicants. In Figures 1 and 2 this gravel rests on a dispersion plate 22, spaced a little above bottom 12 to form a space 24, which may be called the pressure chamber. A hard water feed pipe 14 opens into pressure chamber 24, being led into the tank 10 through its side, as shown, or otherwise. The plate 22 is provided with orifices 26, which are further discussed below. During the softening process hard water is fed into pressure chamber 24 through the feed pipe 14. From the pressure chamber 24 it flows up through orifices 26 into the softening chamber. To prevent vibration of the dispersion plate 22 it may be supported by and secured to stay bolts 28, spaced at suitable intervals as discussed in Patent No. 1,891,061, above mentioned.

In the structure shown in Figures 3 and 4 the gravel rests on a bed of concrete 30 which may rest on the bottom 12 or on a bed of loose material 32. Imbedded in the concrete 30 are dispersion pipes 34, each connected to the feed pipe 14 and provided with orifices 36, which are described further hereinafter. In this form water is fed from feed pipe 14 through dispersion pipes 34 to the softening chamber. Although in this form there is not what is ordinarily called a pressure chamber, the various pipes 34 and 14 form what, for many purposes, may be considered such a chamber.

In each form of softener illustrated the location and size of the orifices is very important. It will be noticed at a glance that they are spaced substantially evenly throughout the cross-section of the tank. Their size may be described as being sufficiently small so that the water is compelled to flow uniformly through them all. This means that they must be sufficiently restricted to cause a slight back pressure and therefore retain the pressure substantially uniform throughout the pressure chamber (or throughout the pipes 34). It is difficult to state any exact rules for easily determining the proper sizes under all conditions, since the desired rate of flow in the softener, the flow resistance in other parts of the water system, the desired rate of flow and pressure in the feed pipe, all are relevant factors. It has been found, however, that a total orifice area of approximately one six-hundredth of the tank cross-section will generally give adequate flow and uniform distribution while the flow is properly regulated elsewhere, as by a flow valve in the feed pipe. A ratio of total orifice area to tank area anywhere from about 1/300 to about 1/900 can be used with proper regulation and, in extreme cases, the ratio might be far outside of this range.

Another convenient way of determining the permissible total orifice area is that it should not greatly exceed the cross sectional area of the feed pipe, though this rule may also have many exceptions, and, in fact, is more of a rule for guidance than a rule of limitation. $\frac{1}{16}$ inch is one suitable orifice size.

It may be further explained that the total area of the orifices into any one cell should not be large enough to admit much more than preferred flow of water to that cell, under the ordinary conditions of maximum flow and pressure. The preferred flow of water for each cell is, of course, that proportion of the entire flow in the tank as the cell area is of the entire tank area. For zeolite water softeners the desired maximum flow is usually from four to eight gallons a minute per square foot of area. With the orifices thus restricted, the flow in some cells can be entirely blocked without causing a harmful rate of flow in the other cells, unless the pressure be considerably raised.

The restriction and spacing of the orifices as described goes a long way toward the production of uniform flow throughout the tank as is desired. However, because of the large spaces in and at the bottom of the bed of coarse gravel cross currents, if not prevented, would be set up, which would result in an uneven vertical flow. As described above, this uneven flow would sometimes cause channeling or even blowing of the gravel bed due to the force of the concentrated flow.

To prevent such ruinous results grids 40 are provided. In the form shown in Figures 1 and 2 the grid rests on dispersion plate 26 and, in the form shown in Figures 3 and 4, it rests on the concrete bed 30, and, in fact, may be slightly imbedded in the concrete. In both cases the grid comprises intersecting vertically extending partitions. These partitions may be separate independent longitudinal members or they may be formed as a unit, either for the entire tank or in sections and subsequently joined together. Whatever may be its structure the grid forms a plurality of cells, open at their tops but otherwise substantially non-communicating. To this end the grids should fit snugly along the supporting member and may be secured in place, if necessary. It is not necessary, however, that all the joints be water tight, as the water flowing through a small crack will be unnoticeable, the pressure being nearly the same on both sides. The water also has a tendency to flow upwardly along the grid plates, thereby causing undesirable areas of concentrated flow along each of these plates. To prevent this it is desirable the grid should not extend to the top of the fine gravel bed but preferably extend just to the middle of said bed. As a matter of fact, it is only necessary that some means be provided which offers enough resistance to the lateral flow so that the vertical flow will be the path of least resistance under all ordinary conditions.

The cells of the grid may be of any size except that they must not include a large enough portion of the cross sectional area of the tank to give rise to any of the problems within a cell that are overcome in the tank as a whole by the provision of the grid. In other words, each cell must be so small and the total flow into it must be so restricted that even if the entire flow in such cell is concentrated as much as possible, it will still not be enough to cause channeling. It should be borne in mind, however, that the tendency toward concentration of flow is not so great in even a large cell as in the tank as a whole since it is only in the very large sized tanks that such varying conditions are commonly found as will ordinarily cause a severe channeling. In tanks of 24 inches or less diameter, the flow conditions throughout the cross-section of the tank are apparently sufficiently uniform so that grids are not ordinarily needed.

It is, of course, to be understood that the illustrations and detailed description have been given only by way of example and that many variations could be made especially in connection with different types of apparatus than that illustrated.

We claim:

1. Water treating apparatus comprising, a tank having near the bottom thereof a distribution system having restricted openings regularly located substantially throughout the cross-sectional area of the tank and communicating with means for passing water into said tank through said restricted openings, a graduated gravel bed, means to support said gravel bed to extend chiefly above said openings, and water treating material resting on said gravel bed, a grid comprising: intersecting substantially vertical partition members in said gravel bed and resting on said gravel bed support and forming cells open at their top but otherwise substantially non-communicating except through said restricted openings; said restricted openings having a total area which is less than about one five-hundredth of the total cross-sectional area of the tank.

2. Water treating apparatus comprising, a tank having near the bottom thereof a distribution system having restricted openings regularly located substantially throughout the cross-sectional area of the tank and communicating with means for passing water into said tank through said restricted openings, a graduated gravel bed, means to support said gravel bed to extend chiefly above said openings, and water treating material resting on said gravel bed, a grid comprising: intersecting substantially vertical partition members in said gravel bed and resting on said gravel bed support and forming cells open at their top but otherwise substantially non-communicating except through said restricted openings; said restricted openings having a total area which is less than about one six-hundredth of the total cross-sectional area of the tank.

3. Water treating apparatus comprising a tank having near the bottom thereof a distribution means having restricted openings regularly located substantially throughout the cross-sectional area of the tank and communicating with means for passing water into said tank through said restricted openings, a bed of graduated comminuted particles, supported by said distributing means and to extend chiefly above said openings, and water treating material resting on said gravel bed, and means dividing said tank to form a plurality of cells in said bed of particles, said cells being open at their top but otherwise non-communicating except through said restricted openings, said restricted openings having a total area within the limits of 1/500 to 1/900 of the total cross-sectional area of the tank.

JOHN A. MONTGOMERY.
ROBERT O. FRIEND.